L. M. SHAW.
SPEED CONTROLLING MECHANISM.
APPLICATION FILED AUG. 3, 1916.
1,250,679.
Patented Dec. 18, 1917.
5 SHEETS—SHEET 4.
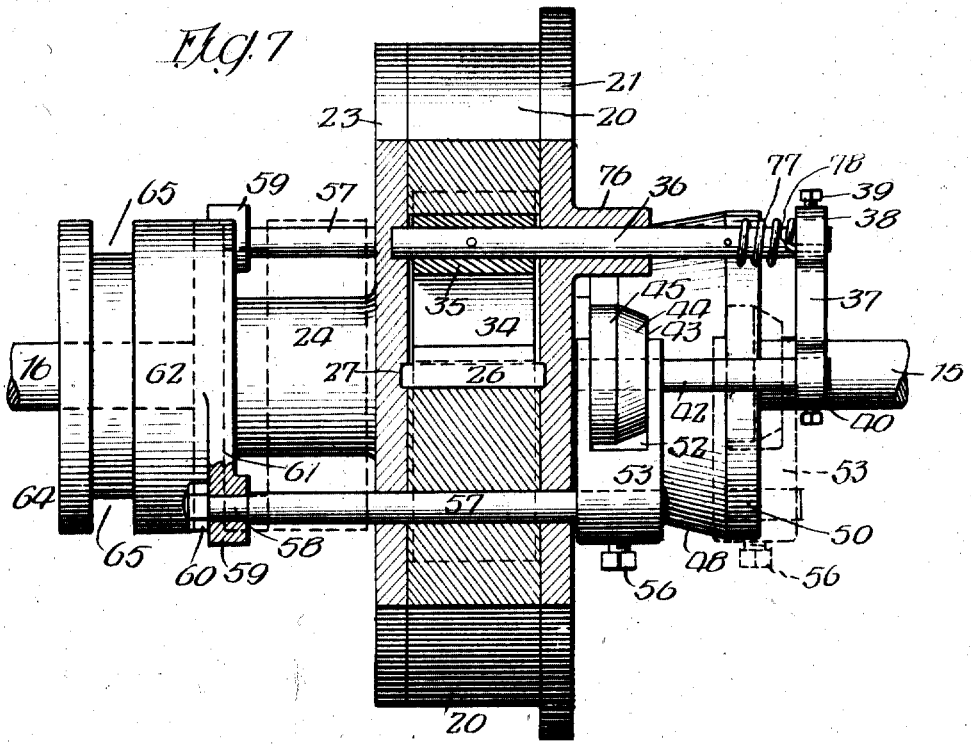
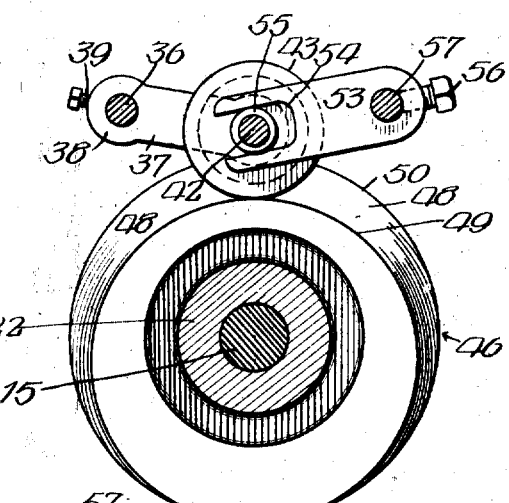
Witness:
H. G. Barrett
Inventor
Levi M. Shaw
By Wm P. Bond Atty.

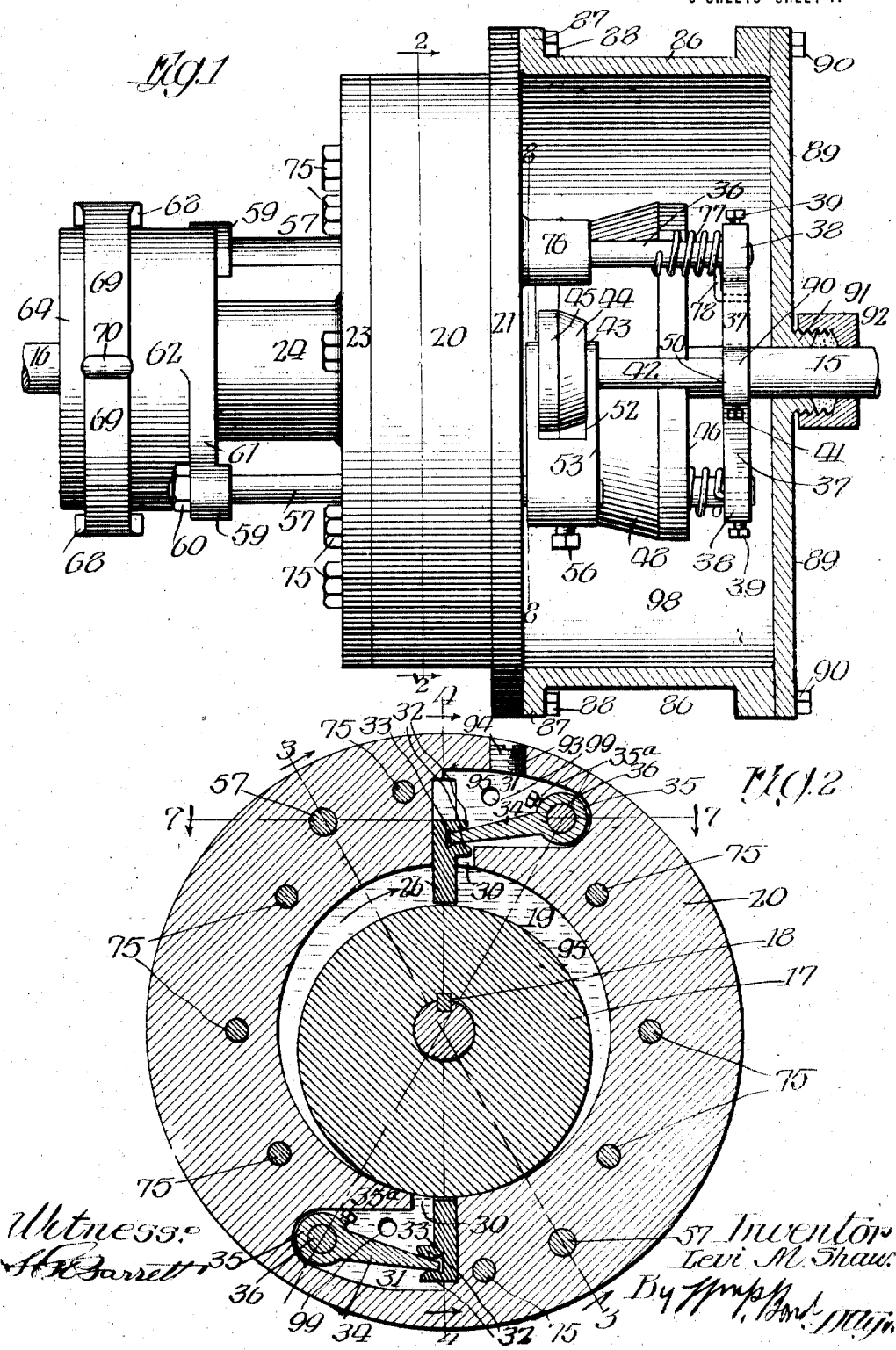

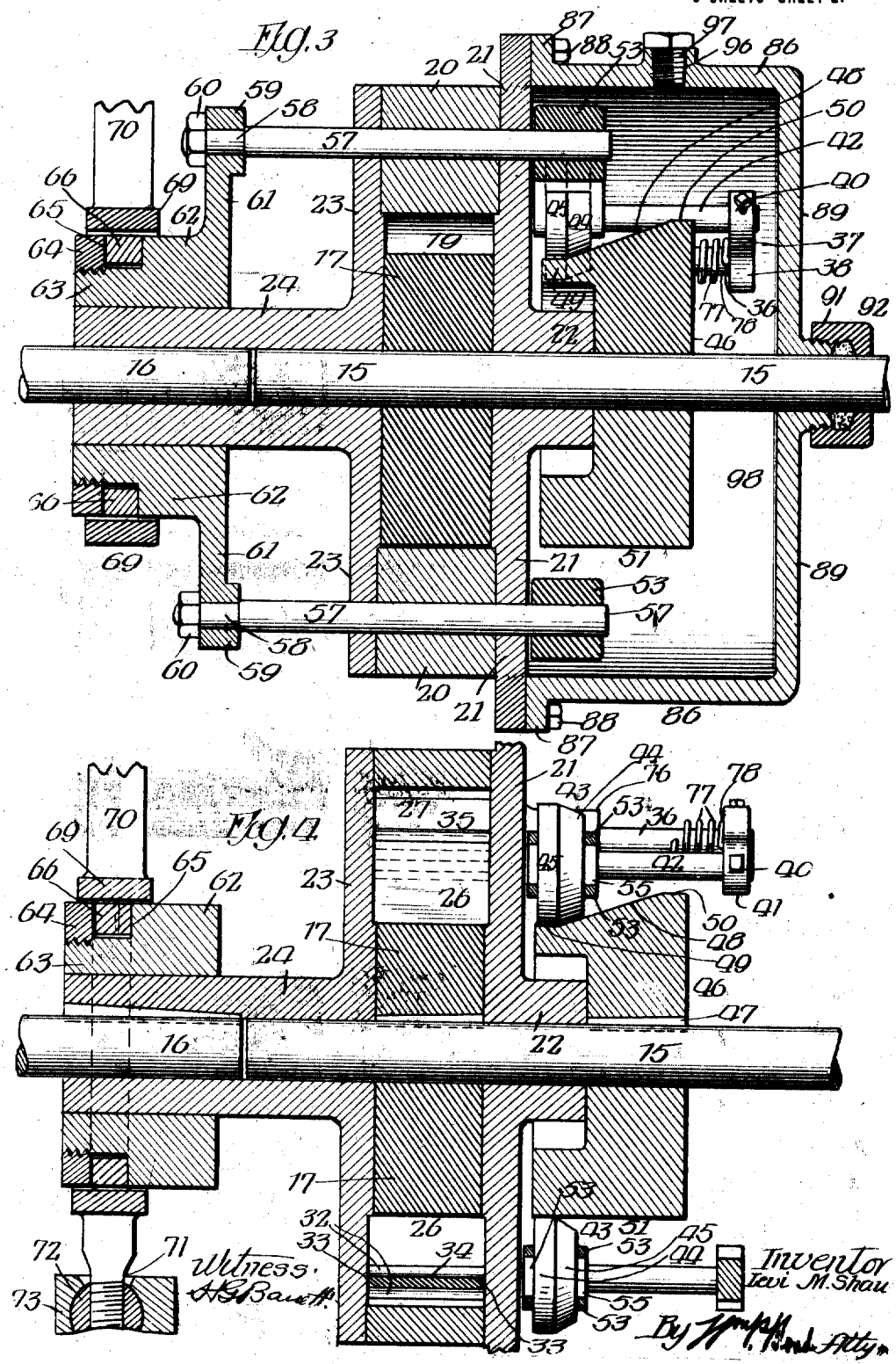

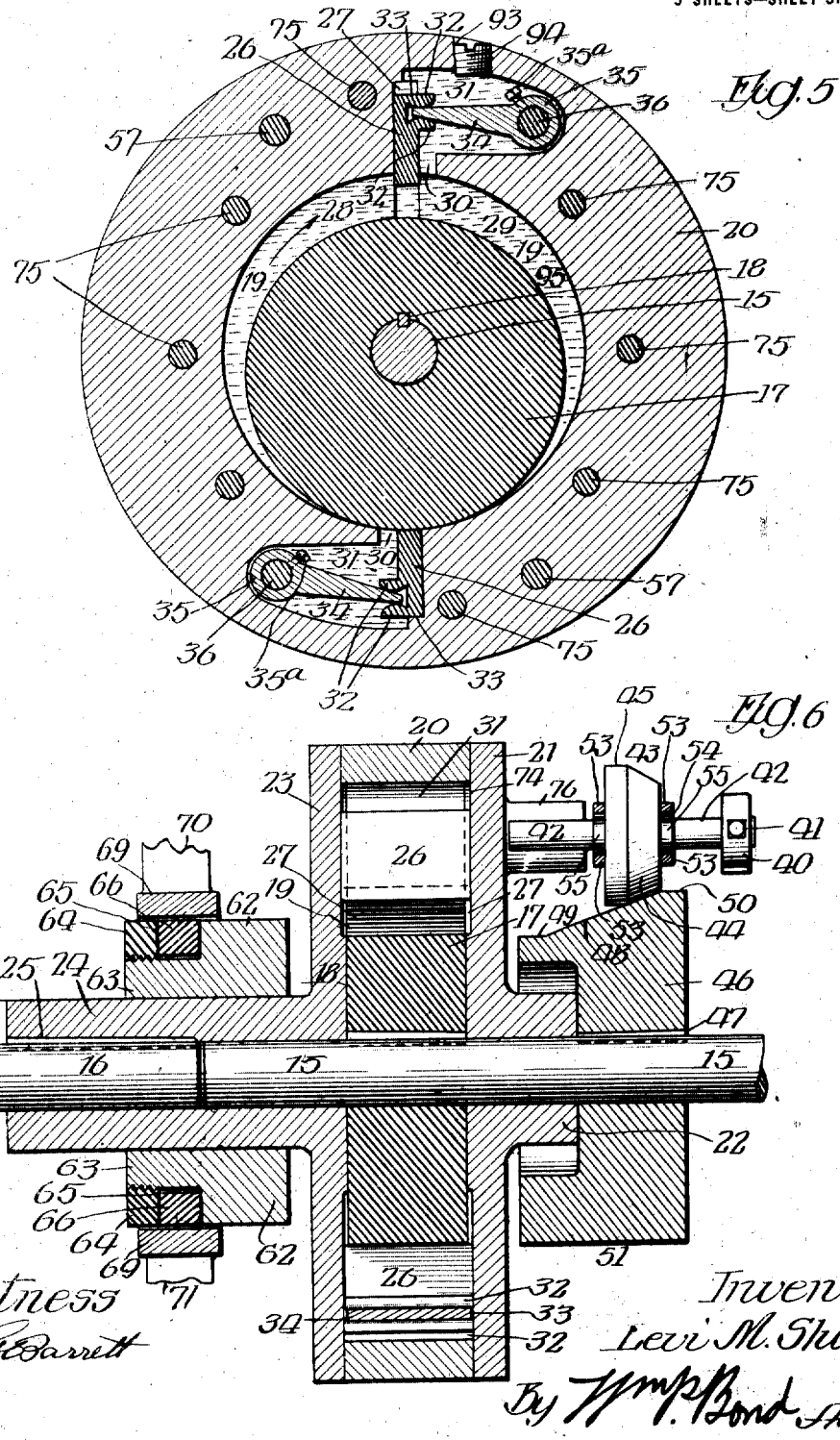

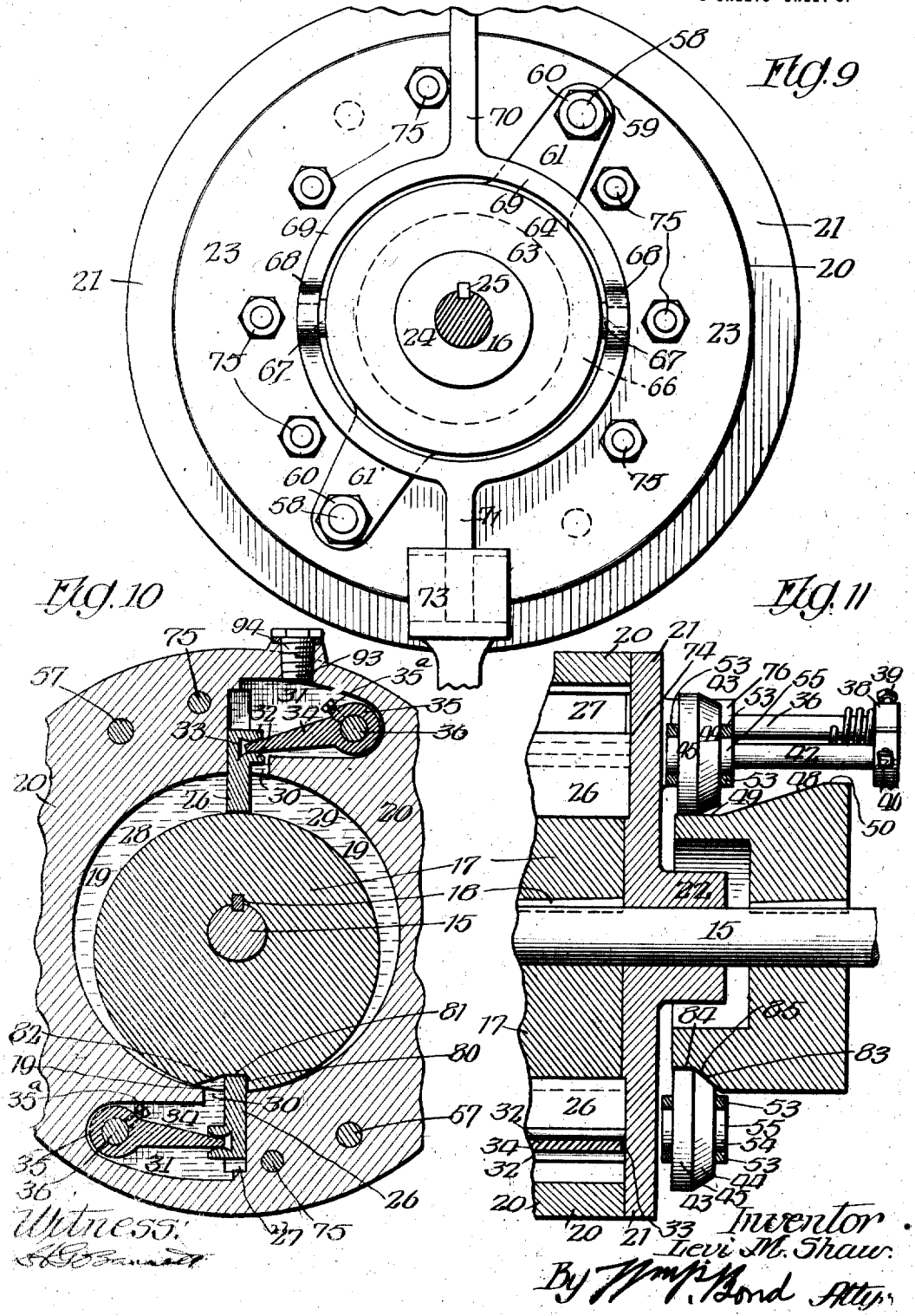

UNITED STATES PATENT OFFICE.

LEVI M. SHAW, OF GLENCOE, ILLINOIS, ASSIGNOR TO HARRY C. JOHNSON, OF GLENCOE, ILLINOIS.

SPEED-CONTROLLING MECHANISM.

1,250,679.     Specification of Letters Patent.     Patented Dec. 18, 1917.

Application filed August 3, 1916. Serial No. 112,970.

*To all whom it may concern:*

Be it known that I, LEVI M. SHAW, a citizen of the United States, residing at Glencoe, in the county of Cook and State of Illinois, have invented certain new and useful Improvements in Speed-Controlling Mechanism, of which the following is a specification.

The present invention relates to a mechanism to be interposed between a divided power or main shaft, or between a driving shaft and a driven shaft, and furnish a connection by means of which the two shaft sections, or the two shafts can be driven at the same speed or at different speeds, or have one shaft section or shaft revolve without imparting rotation to the other shaft section or shaft, and which can be used generally for obtaining differential speeds for any purpose.

The objects of the invention are to insure a positive and reliable connection between two shafts or shaft sections by a mechanism which will regulate the speed of one shaft in relation to the speed of the other shaft; to effect the same speed or a differential speed between two shafts readily and quickly and without excessive jar in making a change of speed; to enable a differential speed to be established between two shafts without affecting materially the speed of the power or driving shaft; to furnish a resistance and a driving or propelling medium, preferably oil, for effecting the connection between two shafts without producing an undue amount of strain and friction in the operation; to provide an adjustable resistance against which the oil presses or impacts, with more or less force or drive, according to the differential speed wanted between the two shafts; to furnish a passageway or channel for the forward travel of the oil; to throttle or choke down the flow of the oil from the exhaust or acting side of the resistance back into the passage way on the supply or non-acting side of the resistance; to cause the resistance when projected into and across the passage or channel for the forward travel of the oil medium, to divide such passageway or channel into a supply section and an exhaust section to enable the oil to flow back from the exhaust section and be returned to the supply section as the resistance travels forward; to employ in the passageway for the travel of the oil an adjustable abutment or gate valve, against the face of which on the exhaust side of the passageway the force or impact of the oil is exerted to impart rotation to the secondary or driven shaft from the primary or driving shaft; to locate and operate in the passage way for the oil oppositely arranged adjustable resistances against the acting faces of which the oil is driven or impacted to impart rotation to the driven shaft from the driving shaft; to give the driving or propelling medium a forward travel in its passageway or channel from and by the rotation of the driving shaft; to regulate and control the speed of the driven shaft by the throttle of the exhaust side of the passageway for the travel of the oil; to positively operate the adjustable resistance from the rotation of the driving shaft; to maintain the projection of the resistances at the same proportionate distance in their circle of travel and furnish the impacting face for the oil medium; to impel or drive forward the propelling medium by a piston mounted on and revoluble with the driving shaft, and regulate and control the projection of the resistances by a cam or eccentric trackway mounted on the driving shaft in line with the piston; to mount the resistances and the means regulating and controlling their distance of projection on a revoluble casing encircling the piston; to actuate the regulating and controlling means for projecting the resistance by the cam or eccentric trackway; to cause the resistances to be gradually receded in passing through the exhaust side of the passageway or channel, and to be gradually advanced in passing through the supply side of the passageway or channel for the combined presented faces of the resistances to be the full acting face for the force or impact of the oil medium; to enable the two shafts, when running at the same speed, to be interlocked by the controlling mechanism and remove excessive strain on the resistances; and to improve generally the construction and operation of the speed controlling mechanism as a whole.

The invention consists of the novel construction, arrangement and combinations of parts hereinafter described and claimed.

In the drawings:—

Figure 1 is a top or plan view of the mechanism of the invention, with the inclosing casing for the trackway or cam and the wheels regulating and controlling the projection of the resistance in section.

Fig. 2 is a sectional elevation on line 2—2 of Fig. 1.

Fig. 3 is a sectional elevation on line 3—3 of Fig. 2.

Fig. 4, a sectional elevation on line 4—4 of Fig. 2.

Fig. 5, a sectional elevation as in Fig. 2, showing the abutment for the resistance projected one fourth into the passageway or channel for the propelling medium.

Fig. 6, a sectional elevation as in Fig. 4, showing the abutment for the resistance projected as in Fig. 5.

Fig. 7, a sectional plan view on line 7—7 of Fig. 2, showing in dotted lines the regulating and controlling wheels, in position for a non-projection of the resistances.

Fig. 8, a side elevation on line 8—8 of Fig. 1, showing the eccentric trackway or cam and the riding wheels for regulating and controlling the projection of the resistances into the passageway or channel for the propelling medium.

Fig. 9, an elevation of the operating lever and slidable sleeve or head for changing the position of the regulating and controlling wheels on the eccentric trackway or cam and adjusting the projection of the resistance into the passageway or channel for the propelling medium.

Fig. 10, a similar view to Fig. 2, showing the piston provided with a locking notch into which a resistance can be projected for locking together the piston and the revoluble casing of the driven or secondary shaft.

Fig. 11, a similar view to Fig. 4, showing the eccentric trackway or cam, provided with a recess into which a regulating and controlling wheel can enter to project the resistance into the locking notch, as shown in Fig. 10. The inclosing casing for the cam and the regulating wheels is omitted in this figure, and in Figs. 4, 6 and 7.

The embodiment of the invention, illustrated in the drawings, has a driving shaft 15 and a driven shaft 16 in line with each other, and connected together by the speed controlling mechanism of the present invention. The shaft 15 is driven from an engine, motor or other source of power in any usual and well known manner.

The shaft 15 has as shown eccentrically mounted thereon a piston 17, locked to the shaft by a key 18, or otherwise, so as to revolve with the shaft. The piston 17 is located and revolves in a chamber 19, which chamber is concentric with the shaft 15 and surrounds the piston 17, forming a crescent shaped passageway or channel, between the face of the piston and the inner face of the peripheral wall of the chamber, as shown in Fig. 2. The chamber 19 is formed within a peripheral or annular wall 20, a side wall or plate 21, having a central hub 22 mounted and free to revolve around the shaft 15, and a side wall or plate 23, having an elongated central hub 24, one portion of which loosely encircles the end of the shaft 15 projecting beyond the face of the revoluble piston 17, with the other portion of the hub 24 locked to the end of the shaft 16 by a key 25, or otherwise, as shown in Fig. 4.

The casing surrounding the chamber has mounted therein slidable abutments or gate valves 26 located directly opposite each other in the casing. Each abutment 26 is adapted to be projected wholly or partly across the passageway or channel of the chamber 19 around the piston 17, and each abutment 26 is free to slide in a groove 27 formed in the walls of the casing.

Each abutment 26 when projected divides the passageway or channel into an exhaust or acting section 28 and a supply or non-acting section 29 for the oil, contained in the chamber 19 and the crescent shaped passageway or channel around the piston. The projection of the abutments takes place alternately with the revolution of the piston; and when projected the abutment throttles or chokes down the return flow of the propelling medium from the exhaust back into supply side of the passageway or channel, causing an impact of the operative medium against the face of the projected abutment on the exhaust or acting side thereof, by which the forward travel of the medium from the rotation of the piston is resisted and will act to revolve the casing and with it the shaft 16 keyed thereto. Each abutment alternately becomes a resistance, when projected against the free passage of the oil from the exhaust to the supply side of the passageway or channel in which the oil travels; and the two resistances will impart more or less speed to the casing and the driven shaft 16 from the rotation of the piston 17 and the driving shaft 15, depending on the throttle given to the travel of the oil in its return from the exhaust side to the supply side of the passageway or channel. While oil is preferred, it is to be understood that any liquid that will serve as a propelling medium can be employed.

The chamber 19 has leading therefrom on opposite sides thereof a port or passage 30 in the peripheral wall 20 of the casing, and these ports 30 are not in line with each other and are located adjacent to but on opposite sides of the abutments, or gate valves 26, as shown in Fig. 2. Each port 30 leads into a chamber 31 in the peripheral wall 20 of the casing, and these chambers stand in opposite directions to each other as shown in Fig. 2.

Each abutment 26 at its outer end on its non-acting side has lugs or ears 32, between which is a recess 33, in which is entered the free end of an arm 34, having at the opposite or inner end a collar 35 encircling a rock-shaft 36 and united thereto by set screws 35ᵃ, or other suitable means, for the rock of the shaft 36 to raise and lower the free end of the arm 34 and withdraw or project its abutment 26 out of and into the passageway of the oil. An actuating arm 34 and rock-shaft 36 is provided for each abutment.

Each rock-shaft 36, at its inner end, is mounted in the wall or head 23 of the casing; and each rock-shaft 36 passes through and extends some distance beyond the wall 21 of the casing. A link 37 is fixedly attached to the outer end of each rock shaft 36 by a collar 38 and a set screw 39 or other suitable means, permitting the adjustment of the link in co-acting relation to raise and lower the free end of the arm 34 for operating its sliding abutment 26 as required.

The other end of each link 37 is fixedly attached by a collar 40, and set screw 41, or other suitable means, to the outer end of a shaft 42, on which is revolubly mounted an operating wheel 43 for raising and lowering the shaft 42, and through the link 37, rocking the shaft 36, and raising and lowering the free end of the arm 34 and causing the abutment to be receded or advanced.

Each wheel 43 has a beveled peripheral face 44 and a flat peripheral face 45, and the two wheels 43 are located opposite each other, and are arranged to be in contact with and engaged by the acting face of a head 46 secured to the driving shaft 15 by a key 47 or other suitable means so that the head 46 will revolve with the shaft. The head 46 has an acting face consisting of a beveled section 48, corresponding in its incline to the incline of the beveled face 44 of the wheels 43, a flat peripheral face 49 at the small end of the beveled face 48, and a flat peripheral face 50 at the large end of the tapered or beveled section or face 48, over and in contact with which faces the wheels 43 are moved in and out, to lower and raise the links 37 and rock the shafts or rods 36 and lower and raise the free end of the arms 34 and cause the abutments 26 to be advanced and receded.

The faces 48, 49 and 50 of the head 46 form a trackway on which the regulating and controlling wheels 43 ride or travel, and this trackway for the faces 48 and 49 is eccentric to the shaft 15, the face 49 corresponding to and coinciding with the eccentricity of the piston 17 on this same shaft 15 by which shaft both the trackway head 46 and the piston 17 are revolved in the same direction and at the same speed.

The circumference of the face 49 coincides with the circumference of the eccentric piston, and the circle of eccentricity for the face 49 and the piston 17 correspond one with the other, but the circle of eccentricity grows less and less across the circumference of the face 48 of the trackway and ceases entirely at the line of juncture with the face 50, the circumference of which coincides with the full circle of the chamber 19 in which the eccentric piston revolves. The piston 17 at the line of its long radius has a flat face extending across the full width of the piston, and the head 46 has a corresponding and coinciding flat face, extending across the full width of the trackway formed by the faces 48, 49 and 50, as shown in Fig. 4.

The piston 17 and the head 46 revolve at the same speed as the driving shaft 15 and the piston 17 and trackway both have the same rotation, maintain the same relative position during their revolutions, and have the same circle of travel given to the coinciding eccentric faces for the circumference of the trackway, as it travels around in engagement with the regulating and controlling wheels 43 to adjust the relative projection of the abutments or gate valves 26 toward and from the face of the piston.

Each regulating and controlling wheel 43 is located in a slot 52 of an arm 53; and each arm 53 has a cross slot 54 into which is entered a center hub 55 on each side of the wheel 43, as shown in Fig. 11. Each arm 53 is fixedly secured by set screws 56 or other suitable means to a slidable rod 57, passing through the revoluble casing, which rods are located opposite each other, as shown in Fig. 3. Each slidable rod 57 has a reduced end 58, which passes through a boss 59 and receives a nut 60, by which it is firmly secured in the boss. Each boss 59 has an arm 61 extending from a head 62 slidably mounted on the exterior of the elongated hub 24 of the side wall or plate 23 of the casing. The outer end of the slidable head 62 is reduced in diameter to form a neck 63, and the end of this neck has threaded or otherwise secured thereon a ring 64, leaving a groove 65 between the ring 64 and the shoulder of the neck 63, in which groove is located a ring 66 encircling the neck 63, and having oppositely projecting trunnions 67 which enter ears or enlargements 68 on opposite sides of a yoke 69, having a handle 70 extending from its upper end or side, and a threaded stem 71 projecting from its lower end or side, which stem is entered into a circular bearing 72 mounted in a box 73 fixedly supported in any suitable manner, for the bearing and box to serve as a fulcrum for the yoke lever.

The throw of the yoke lever 69 and 70 in an outward direction moves the slidable head 62 away from the wall 23 of the revoluble casing, and the throw of this yoke lever inwardly moves the slidable head 62 toward the wall 23 of the revoluble casing. The outward movement of the slidable head 62 through the arms 61 carries with it both of the sliding rods 57, moving both arms 53 and both regulating and controlling wheels 43 toward the wall 21 of the revoluble casing. The inward movement of the slidable head 62, through the arms 61, carries with it both of the sliding rods 57, moving both arms 53, and both regulating and controlling wheels 43 away from the wall 21 of the revoluble casing. It will thus be seen that the movements of the slidable head outward and inward gives both sliding rods 57 a simultaneous reciprocating movement, and this reciprocating movement of the sliding rods moves in unison, the two regulating and controlling wheels 43 across the revolving trackway in both directions.

The limit of the outward throw of the yoke-lever 69—70 is one to move the slidable head 62, the sliding rods 57, the arms 53, and the wheels 43, into the position shown in Figs. 1, 2, 3 and 4 for the faces 45 of both wheels to ride on the face 49 of the trackway and the faces 44 of both wheels to ride on the face 48 of the trackway at the commencement of the bevel or taper. The wheels 43 with their peripheral faces 45 contacting and riding against the face 49, and in the position shown in Figs. 1, 2, 3 and 4 has the upper wheel 43 centrally in line with the short radius of the eccentricity of the face 49 of the trackway and the lower wheel 43 centrally in line with the long radius of the eccentricity of the face 49 of the trackway. The upper wheel 43, when in this position, allows the free end of the link or bar 37 to drop or be forced down, giving a downward rock to its rock shaft 36, which acts to throw down the free end of the arm 34 and project the upper abutment 26 across the full space of the passage around the piston 17 in the chamber 19, as shown in Figs. 2, and 4, throttling or choking off any escape or flow of the oil from the exhaust side into the supply side of the passageway and furnishing a resistance for the full force of the forward travel of the piston to act against the oil and impart the same speed or approximately so, to the revoluble casing as the speed of the piston, transmitting to the secondary or driven shaft 16 the same speed as that of the primary driving shaft 15, giving the two shafts the same approximate speed.

At the same time the lower wheel 43 at the longest line of the eccentricity of the face 49 depresses the free end of its link 37, giving a downward rock to its shaft 36, which throws down the free end of its arm 34 and withdraws the lower abutment 26 wholly within the chamber 31 and clear of the peripheral face of the piston 17, as shown in Fig. 2. The periphery of the face 49 of the trackway coincides with the periphery of the piston 17, and as the piston 17 and the head or block 46 revolve in unison and at the same speed the two resistances will maintain the same relative advanced and receded positions as long as the faces 45 and 49 remain in contact, and the projected abutment 26 will serve as the resistance against the acting face of which the oil impacts to carry the casing around with and at practically the speed of the piston, and in this operation the propelling or power transmitting medium travels as a solid body in unison with the piston and does not have a separate movement or travel independently of the piston travel.

The limit of the inward throw of the yoke-lever 69—70 is one to move the slidable head or sleeve 62, the sliding rods or shafts 57, the arms 53 and the wheels 43 into the position shown by dotted lines in Fig. 7 for the faces 43 of both wheels to ride on the face 50 of the trackway, the circumference of which coincides with the circumference of the chamber 19 of the revoluble casing. The wheels 43 when in this position have no rising and falling movement as the face 50 is a true circle, and both wheels will move the free ends of their respective links 37, and rock both shafts 36 in the direction for moving the free ends of the arms 34, and withdrawing the two abutments 26 into the chambers 31, and non-projecting them into the passageway or channel around the piston 19, as shown for the lower abutment 26 in Fig. 2. The withdrawal of the resistances, furnished by the abutments 26 from the passageway allows the piston 17 to revolve without transmitting any force to revolve the casing, which with the driven shaft remains stationary; and this condition will continue as long as the faces 45 of the regulating and controlling wheels 43 remain in engagement with the face 50 of the trackway.

The throw of the adjusting lever to a given point intermediate of the full outward and inward throws will, through the sliding shafts 57, and the supporting arms 53, locate the regulating and controlling wheels 43, at a line of travel for the faces 44 of both wheels on the face 48 of the trackway corresponding to the throw of the adjusting lever 69—70 inwardly from its outward limit of movement, that is to say, if the adjusting lever 69—70 is moved inwardly three-fourths of its full throw the regulating and controlling wheel 43 will be located at a three-quarter line of travel for the faces 44 on the face 48 of the trackway; if the lever is moved to half of its full throw, the faces 44 of the wheels 43 will be located and travel at the half-way line of the face 48 of the trackway; if the lever is moved a quarter of its full throw, the face 44 of the wheels 43 will be located and travel at the quarter-way line of the face 48 of the trackway, starting from the juncture of the beveled or tapered face 48 with the flat face 49 of the trackway as the line for the measurements.

The position of the regulating and controlling wheels, as to the line of travel of their faces 44 on the face 48 of the trackway, governs the amount of projection of the abutments or gate valves 26 into the passageway around the piston 17, to give the required resistance to the forward travel of the medium to obtain the required differential speed between the driving and driven shafts that is desired. The travel of the faces 44 of the regulating and controlling wheels 43 at the three-quarter line of the face 48 of the trackway will give a one-fourth projection for the abutments 26 alternately; the travel of the wheels 43 at the half-way line of the face 48 of the trackway will give a one-half projection for the abutments 26 alternately; and the travel of the wheels 43 at the quarter-way line of the face 48 will give a three-fourth projection for the abutments or gate valves 26 into the passageway.

The position of the several parts or elements of the mechanism to obtain a one-fourth projection alternately of the abutments or gate valves 26 is shown in Figs. 5 and 6, in which the adjusting lever 69—70 is at the three-fourths position of its inward throw and the sliding shafts 57 have carried the wheels 43 to the three-quarter line of travel on the face 48 of the trackway, at which line of travel the eccentricity of the face 48 of the trackway, as it passes in engagement with the faces 44 of the wheels 43, will give the wheels a rising and falling movement by which the free ends of the links 37 are raised and depressed alternately to rock upwardly and downwardly the shafts 36 and raise and depress the arms 34 to recede and advance the abutments, one abutment receding as the other abutment advances—and each full advance of an abutment projects such abutment one-fourth into and across the pathway or channel for the driving or propelling medium.

The full one-fourth projection of each abutment 26 into the passageway will occur as the short radius of the eccentricity of the face 48 passes in contact with the face 44 of a wheel 43; and this projection will be a gradual one owing to the eccentricity of the face 48 of the trackway. After an abutment has reached the full one-quarter projection it will be gradually receded, the full recession occurring as the long radius of the face 48 passes in contact with the face 44 of the wheel 43, with the result that while one abutment is being gradually receded the other abutment at the same time is being gradually advanced, and a full one-quarter throttle of the passageway or channel is continuously present during every complete revolution of the piston, and a resistance to the propelling medium for revolving the casing and the driven shaft is had from the projected one-fourth of the abutments 26 against which the propelling medium impacts.

The projection of one-fourth of the abutments 26 throttles the exhaust of the passageway or channel one-quarter leaving a three-quarter clearance for the travel of the oil, producing a corresponding reduction to the impact or driving force of the medium against the acting faces of the resistances, with the result that the rotation of the casing and the driven shaft will be approximately one-fourth of the rotation of the piston, giving the driven shaft one-quarter of the speed approximately of the driving shaft, which differential speed will continue as long as the wheels 43 are adjusted and held at the three-quarter position on the face 48 of the trackway.

The foregoing describes the arrangement and operation of the parts to effect a one-fourth speed of the driven shaft with respect to the full speed of the driving shaft. By adjusting the wheels to different positions on the trackway, the abutments will be moved a corresponding maximum distance into the oil passage, and in the same manner as described above any variable speed between the driving and driven shafts obtained. The sole difference in the operation from obtaining a speed of four to one and any other ratio would be the difference in the position upon the trackway on which the wheels were placed.

It is to be noted that no matter what the position of the wheels 43 may be to the faces 48 and 49 of the trackway, the complete projection of an abutment any given distance will occur as a wheel 43 is passed by the short radius line of the trackway face, and the complete withdrawal of an abutment will occur as a wheel 43 is passed by the long radius line of the trackway, and no change in the speed of the driving shaft is required or necessary in obtaining a differential speed for the driven shaft, it only being necessary to change the position of the regulating and controlling wheels 43 in their relation to the eccentric or cam surface of the trackway, which change is easily and quickly effected without any appreciable jar or concussion by the slidable shafts, the arms for the wheels, the links, the rock shafts and the abutment arms, in the manner described.

Each side wall or head 21 and 23 has its peripheral inner face provided with a recess 74 to receive the side face of the wall 20 and make a tight joint between the walls 20, 21 and 23 of the casing, and if desired a gasket may be used in this joint. The walls of the casing are secured together by bolts 75 or other suitable means. Each rock shaft 36 is supported at its projected portion by a bearing 76 on the outer face of the wall 21 of the casing. A coil spring 77 encircles each rock shaft 36, and has one of its ends secured to the shaft, and its other end 78 is made to bear downwardly on the link 37, and insure a constant and positive engagement of each wheel 43 against the cam or trackway at all times irrespective of the position of the wheels in relation to the cam or trackway, but other means than a coil spring can be employed for this purpose.

The periphery of the piston 17 in line with the long radius of eccentricity, as shown in Fig. 10, is provided with a recess or notch 79, having a straight face 80, a flat face 81 and an inclined face 82, which recess 79, when the upper abutment 26 is projected entirely across the pathway or channel for the travel of the oil, allows the lower abutment 26 to enter the recess and have the straight face 80 engage the side face of the abutment and interlock the piston and casing for their rotation in unison. This interlocking of the piston and casing is for the purpose of removing the strain on the projected upper abutment in revolving the casing and the driven shaft from and in unison with the revolution of the piston.

The head or block 46 to permit the projection of the lower abutment 26 into the recess 79, has an extension for the wall of its flat eccentric face 49 and this extension has a depression 83 in alinement with the recess or notch 79, which depression 83 is formed with a flat face 84 and an inclined face 85, permitting the lower wheel 43 to enter the depression 83 and raise the link 37 to rock the shaft or rod 36 and raise the arm 34 and carry the lower abutment 26 into the recess 79 and interlock the piston and casing as described.

The interlock of the piston 17 and the casing will continue as long as the lower wheel 43 is entered into the depression 83, but is broken with the passing of the wheel 43 from the flat face 49 onto the tapered or beveled face 48 of the trackway.

A casing is shown inclosing the head 46, the wheels 43, the rods 42, the links 37, and the rock shafts 36, which casing is for the purpose of containing oil and operating the parts or elements named in oil. This inclosing casing has a peripheral wall 86 with a flange 87 for uniting the wall 86 to the wall 21 by lag screws 88 or other suitable means, and an end wall or head 89 attached by lag screws 90 to the end of the wall 86 and having a hub 91 provided with a stuffing box 92 around the driving shaft 15 to prevent leakage of the oil from the inclosing casing. The peripheral wall 20 of the revoluble casing inclosing the chamber 19 and the piston 17 has a filling hole 93 closed by a plug 94 for supplying the chamber 19 with the oil or propelling medium 95, which also fills the chambers 31 as well as the chamber 19 in the operation of the speed controlling mechanism of the invention. The inclosing casing also has its peripheral wall 86 provided with a filling hole 96 closed by a plug 97 for supplying oil to the chamber 98 of such casing.

In operation the chambers 19 and 31 are to be filled with oil or other suitable propelling medium, for the medium to surround the piston in the passageway or channel. The engine, motor or other source of power, is started to revolve the driving shaft 15 and with it the piston 17 and the head 46 of the trackway. The rotation of the piston gives a forward travel in the passageway or channel of the chamber to the oil as hereinbefore described, and the rotation of the head with the trackway thereon, through the wheels 43, the links 37, the rock-shafts 36 and the arms 34 projects the abutments 26 for the projection to throttle the exhaust and present a resistance to the forward travel of the oil in the passageway to drive the casing and the driven shaft in the manner hereinbefore described and pointed out.

The essential and novel feature of the present invention is a variable throttle for the exhaust side of the travel of a propelling medium, given its impetus from the rotation of a piston; and at the same time have this throttling create and present a resistance, against which the propelling medium impacts to impart a differential speed between a driving and a driven shaft, or have the speed of both shafts, approximately the same or have the driving shaft free to revolve without revolving the driven shaft; and it is to be understood that it is not the intention to confine the carrying out of the operation of this invention to the arrangement and combination of the elements shown and described, since the invention is only to be limited as may be, by the terms of the appended claims.

It is to be understood that the chambers 19 and 31, when filled with the oil or other propelling medium, must provide a clearance of sufficient capacity for the displacement produced by the projection of the abutments into and across the passageway in which the medium travels; and at the same time this clearance must not interfere appreciably with the impact of the propelling medium. A self-feeding oil cup can be attached to the filling hole 96 for keeping the chamber 98 properly filled with oil; and instead of having a filling hole 93 the oil for the chambers 19 and 31 can be supplied from the chamber 98 by means of ports 99 leading into the chambers 31 from the chamber 98, as shown in Fig. 2.

What I claim as new and desire to secure by Letters Patent is:—

1. In a speed-controlling mechanism, the combination of a driving shaft, a driven shaft, a casing fixedly mounted on the driven shaft and loosely mounted on the driving shaft, a piston eccentrically secured to the driving shaft, said casing having a circular chamber in which the piston revolves, said chamber being of greater diameter than the piston to provide a passageway between the periphery of the piston and the wall of the chamber, a propelling medium in said chamber given a forward travel in the passageway by the rotation of the piston, a slidable abutment mounted on the wall of the casing and adapted to be projected into and across the passageway and throttle the passageway and furnish a resistance to the forward travel of the propelling medium whereby rotation is imparted to the casing and driven shaft, and means for advancing and retracting the abutment, substantially as described.

2. In a speed-controlling mechanism, the combination of a driving shaft, a driven shaft, a casing fixedly mounted on the driven shaft and loosely mounted on the driving shaft, a piston eccentrically carried by the driving shaft, said casing having a circular chamber in which the piston revolves, said chamber being of greater diameter than the piston, leaving a passageway between the periphery of the piston and the wall of the chamber, a propelling medium within the chamber and given a forward travel in the passageway by the rotation of the piston, a pair of oppositely-arranged slidable abutments mounted in the casing and each abutment adapted to be projected variable distances into and across said passageway and to be entirely withdrawn from such passageway, and means for retracting and advancing the abutments, substantially as described.

3. In a speed-controlling mechanism, the combination of a driving shaft, a driven shaft, a casing fixed to the driven shaft and loose upon the driving shaft, a piston eccentrically carried by the driving shaft, said casing having a circular chamber in which the piston revolves, said chamber being of greater diameter than the piston, leaving a passageway between the periphery of the piston and the wall of the chamber, a propelling medium filling the chamber and given a forward travel in the passageway by the rotation of the piston, a pair of oppositely-arranged slidable abutments mounted in the casing, and each abutment adapted to be projected variable distances into and across the passageway for the propelling medium and to be entirely withdrawn from such passageway, a pair of oppositely-arranged laterally-slidable and revoluble wheels, means connecting the wheels with the abutments, and means for giving both wheels a rising and falling movement to advance and retract the abutments with respect to the passage, substantially as described.

4. In a speed-controlling mechanism, the combination of a driving shaft, a driven shaft, a casing fixed to the driven shaft and loose upon the driving shaft, a piston eccentrically carried by the driving shaft, said casing having a circular chamber in which the piston revolves, said chamber being of greater diameter than the piston, leaving a passageway between the periphery of the piston and the wall of the chamber, a propelling medium filling the chamber and given a forward travel in the passageway by the rotation of the piston, a pair of oppositely-arranged slidable abutments mounted in the casing and adapted to be projected variable distances into and across the passageway and to be entirely withdrawn from such passageway, a pair of oppositely-arranged laterally-slidable and revoluble wheels, means connecting the wheels with the abutments, and a head mounted on and revoluble with the driving shaft and having a peripheral trackway for giving the wheels a rising and falling movement to advance and retract the abutments with respect to said passage, substantially as described.

5. In a speed-controlling mechanism, the combination of a driving shaft, a driven shaft, a casing fixed to the driven shaft and loose upon the driving shaft, a piston eccentrically carried by the driving shaft, said casing having a circular chamber in which the piston revolves, said chamber being of greater diameter than the piston, leaving a passageway between the periphery of the piston and the wall of the chamber, a propelling medium filling the chamber and given a forward travel in the passageway by the rotation of the piston, a pair of oppositely-arranged slidable abutments mounted in the casing and each abutment adapted to be projected variable distances into and across the passageway, a pair of oppositely-arranged laterally-slidable and revoluble wheels, each wheel having a periphery formed of a flat face and a beveled face, means connecting the wheel with the abutments, and means engaging with the peripheries of the wheels and giving the wheels a rising and falling movement, substantially as described.

6. In a speed-controlling mechanism, the combination of a driving shaft, a driven shaft, a casing fixed to the driven shaft and loose upon the driving shaft, a piston eccentrically carried by the driving shaft, said casing having a circular chamber in which the piston revolves, said chamber being of greater diameter than the piston, leaving a passageway between the periphery of the piston and the wall of the chamber, a propelling medium filling the chamber and given a forward travel in the passageway by the rotation of the piston, a pair of oppositely-arranged slidable abutments mounted in the casing and each abutment adapted to be projected variable distances into and across the passageway and to be entirely withdrawn from such passageway, a pair of oppositely-arranged laterally-slidable and revoluble wheels, each wheel having a periphery formed of a flat face and a beveled face, means connecting the wheels with the abutments, and a head mounted on and revoluble with the driving shaft and having a periphery formed of a flat eccentric face, a beveled eccentric face, and a flat circular face, the faces constituting a trackway for engaging the peripheries of the wheels and giving the wheels a rising and falling movement to advance and retract them with respect to the passageway, substantially as described.

7. In a speed-controlling mechanism, the combination of a driving shaft, a driven shaft, a casing fixed on the driven shaft and loose on the driving shaft, a piston eccentrically carried by the driving shaft, said casing having a circular chamber in which the piston revolves, said chamber being of greater diameter than the piston, leaving a passageway between the periphery of the piston and the wall of the chamber, a propelling medium filling the chamber and given a forward travel in the passageway by the rotation of the piston, a pair of oppositely-arranged slidable abutments mounted in the casing and each abutment adapted to be projected into and across the passageway and to be entirely withdrawn from such passageway, the periphery of the piston having a recess adapted to be entered by an abutment and interlock the piston and casing, and means for advancing and retracting the abutments, substantially as described.

8. In a speed controlling mechanism, the combination of a driving shaft, a driven shaft, a casing fixed on the driven shaft and loose on the driving shaft, a piston eccentrically carried by the driving shaft, said casing having a circular chamber in which the piston revolves, said chamber being of greater diameter than the piston, leaving a passageway between the periphery of the piston and the wall of the casing, a propelling medium filling the chamber and given a forward travel in the passageway by the rotation of the piston, a pair of oppositely-arranged slidable abutments in the casing, and each abutment adapted to be projected into and across the passageway and to be entirely withdrawn from such passageway, a pair of oppositely-arranged revoluble wheels, means connecting the wheels and the abutments for retracting and advancing the abutments, the periphery of the piston having a recess adapted to be entered by an abutment and interlock the piston and casing, and a head mounted on and revoluble with the driving shaft and having a periphery formed of a flat eccentric face, a beveled eccentric face, and a flat circular face, the faces constituting a trackway for engaging the peripheries of the wheels and giving the wheels a rising and falling movement, a slotted arm for each wheel, a reciprocating shaft for each arm, and the face 49 of the trackway being provided with a depression into which a wheel is adapted to drop and cause an abutment to enter the recess of the piston and interlock the piston and casing, substantially as described.

9. In a speed-controlling mechanism, the combination of a driving shaft, a driven shaft, a casing fixed on the driven shaft and loose on the driving shaft, a piston mounted on and revoluble with the driving shaft, said casing having a chamber in which the piston revolves, said casing being of greater diameter than the piston, leaving a passageway between the periphery of the piston and the wall of the chamber, a propelling medium filling the chamber and given a forward travel in the passageway by the rotation of the piston, means adapted to be projected into and across the passageway and to be entirely withdrawn from such passageway, a head mounted on and revoluble with the driving shaft, means interposed between the head and said projected means for retracting and advancing said projected means, and coöperating means on the piston and head to interlock the piston and the casing, substantially as described.

10. In a speed-controlling mechanism, the combination of a drive shaft, a driven shaft, a chambered member connected to the driven shaft, a piston on the drive shaft eccentrically located in the interior of said chambered member to provide a passage between the outer periphery of the piston and the inner wall of said chambered member, said piston when moved with respect to the inner wall of said chambered member changing the area of said passage at any given point on said inner wall, a propelling medium within said chambered member and given a movement within said passage by the rotation of the piston, a series of movable abutments carried by said chambered member and adapted to be extended into and withdrawn from said passage and provide resistance surfaces to the flow of said medium through the passage, means for moving said abutments into and out of the passage in accordance with the movements of the piston with respect to the inner wall of the chambered member, whereby a uniform aggregate amount of resistance surface is maintained in said passage, and means for varying the degree of movement of said abutments to change the amount of resistance surface presented, substantially as described.

11. In a speed-controlling mechanism, the combination of a drive shaft, a driven shaft, a chambered member connected to the driven shaft, a piston on the drive shaft eccentrically located in the interior of said chambered member to provide a passage between the outer periphery of the piston and the inner wall of said chambered member, said piston when moved with respect to the inner wall of said chambered member changing the area of said passage at any given point on said inner wall, a propelling medium within the chambered member and given a movement within said passage by the rotation of the piston, a series of movable abutments carried by said chambered member and adapted to be extended into and withdrawn from said passage and provide resistance surfaces to the flow of medium through the passage, means operated by the rotation of the drive shaft for moving said abutments into and out of said passage in accordance with the movements of the piston with respect to the inner wall of the chambered member, whereby a uniform aggregate amount of resistance surface is maintained in said passage, and means for varying the degree of movement of said abutments to change the amount of resistance surface presented, substantially as described.

12. In a speed-controlling mechanism, the combination of a drive shaft, a driven shaft, a chambered member revoluble with the driven shaft, a piston revoluble with the drive shaft and eccentrically located in the interior of said chambered member to provide a passage between the outer periphery of the piston and the inner wall of said chambered member, said piston when moved with respect to the inner wall of said chambered member changing the area of said passage at any given point on said inner wall, a propelling medium within the interior of said chambered member and given a movement within said passage by the rotation of the piston, a series of movable abutments carried by said chambered member and adapted to be extended into and withdrawn from said passage and provide resistance surfaces to the flow of said medium through the passage, means secured to the drive shaft for moving said abutments into and out of said passage in accordance with the movements of the piston with respect to the inner wall of the chambered member, whereby a uniform aggregate amount of resistance surface is maintained in said passage, and means for varying the degree of movement of said abutments to change the amount of resistance surface presented, substantially as described.

13. In a speed-controlling mechanism, the combination of a drive shaft, a driven shaft, a chambered member connected to the driven shaft, an eccentric piston on the drive shaft located in the interior of said chambered member and providing a passage between the outer periphery of the piston and the inner wall of said chambered member, said piston when moved with respect to the inner wall of the chambered member changing the area of said passage at any given point on said inner wall, a propelling medium within the chambered member given a movement within said passage by the rotation of the piston, a series of movable abutments carried by the chambered member and adapted to be extended into and withdrawn from said passage and provide resistance surfaces to the flow of medium through said passage, a cam operated by the movements of the drive shaft, means actuated by the movements of the cam for moving said abutments into and out of the passage, said cam being configured to move said abutments in accordance with the movements of the piston with respect to the inner wall of the chambered member, whereby a uniform aggregate amount of resistance surface is maintained in said passage, and means for shifting the position of the abutment moving means with respect to the cam to change the amount of resistance surface presented, substantially as described.

14. In a speed-controlling mechanism, the combination of a drive shaft, a driven shaft, a chambered member connected to the driven shaft, a piston on the drive shaft, said piston lying eccentrically within the interior of said chambered member and forming a passage between the outer periphery of the piston and the inner wall of said chambered member, a propelling medium within the interior of said chambered member and given a movement within said passage by the rotation of the piston, said piston when moved with respect to the inner wall of the chambered member gradually increasing and decreasing the passage area at any given point on said wall, a pair of oppositely-disposed movable abutments carried by said chambered member and adapted to move into and out of said passage to form resistance surfaces to the flow of medium through said passage, means carried by the drive shaft for controlling the in and out movements of said abutments simultaneously and in parallel directions and in correspondence to the relative movement of said piston with respect to the inner wall of the chamber, whereby the same aggregate amount of resistance surface is maintained in said passage, and means for adjusting the movement of the abutments to change the amount of resistance surface presented, substantially as described.

15. In a speed-controlling mechanism, the combination of a drive shaft, a driven shaft, a chambered member secured to the driven shaft, a piston on the drive shaft eccentrically located in the interior of said chambered member to provide a passage between the outer periphery of the piston and the inner wall of said chambered member, a propelling medium within the interior of said chambered member and given a movement within said passage by the rotation of the piston, said piston when moved with respect to the inner wall of the chambered member changing the area of said passage at any given point in said inner wall, a series of movable abutments carried by said chambered member and adapted to be extended into and withdrawn from said passage and provide resistance surfaces to the flow of medium through said passage, a cam secured to the drive shaft, means actuated by the movements of said cam for moving said abutments into and out of said passage, said cam being configured to move said abutments in accordance with the movements of the piston with respect to the inner wall of said chambered member, whereby a uniform aggregate amount of resistance is maintained within said passage, and means for shifting the position of the abutment moving means with respect to the cam to change the amount of resistance surface presented, substantially as described.

16. In a speed-controlling mechanism, the combination of a drive shaft, a driven shaft, a chambered member on the driven shaft, a piston on the drive shaft eccentrically located in the interior of said chambered member to provide a passage between the outer periphery of the piston and inner wall of said chambered member, a propelling medium within the interior of said chambered member given a movement within said passage by the rotation of the piston, said piston when moved with respect to the inner wall of the chambered member changing the area of said passage at any given point on said inner wall, a pair of oppositely-disposed abutments carried by said chambered member adapted to move into and out of said passage to form resistance surfaces to the flow of medium through the passage, means for moving said abutments simultaneously and in corresponding directions, and in correspondence to the relative movements between said piston and the inner wall of the chambered member, whereby the same aggregate amount of resistance surface is maintained in said passage, and means for adjusting the movements of the abutments to change the amount of resistance surface presented, substantially as described.

17. In a speed-controlling mechanism, the combination of a drive shaft, a driven shaft, a chambered member connected to the driven shaft, a piston on the drive shaft eccentrically located in the interior of said chambered member to provide a passage between the outer periphery of the piston and the inner wall of said chambered member, said piston when moved with respect to the inner wall of said chambered member changing the area of said passage at any given point on said inner wall, a propelling medium within said chambered member and given a movement within said passage by the rotation of the piston, a series of movable abutments carried by said chambered member and adapted to be extended into and withdrawn from said passage and provide resistance surfaces to the flow of said medium through the passage, means for moving said abutments into and out of the passage in accordance with the movements of the piston with respect to the inner wall of the chambered member, whereby a uniform aggregate amount of resistance surface is maintained in said passage, means for varying the degree of movement of said abutments to change the amount of resistance surface presented, and means for maintaining said abutments fully retracted from the passage to effect a disconnection between the drive and driven shafts, substantially as described.

18. In a speed-controlling mechanism, the combination of a drive shaft, a driven shaft, a chambered member connected to the driven shaft, a piston on the drive shaft eccentrically located in the interior of said chambered member to provide a passage between the outer periphery of the piston and the inner wall of said chambered member, said piston when moved with respect to the inner wall of said chambered member changing the area of said passage at any given point on said inner wall, a propelling medium within said chambered member and given a movement within said passage by the rotation of the piston, a series of movable abutments carried by said chambered member and adapted to be extended into and withdrawn from said passage and provide resistance surfaces to the flow of said medium through the passage, means for moving said abutments into and out of the passage in accordance with the movements of the piston with respect to the inner wall of the chambered member, whereby a uniform aggregate amount of resistance surface is maintained in said passage, means for varying the degree of movement of said abutments to change the amount of resistance surface presented, and means for maintaining said abutments projected fully across the passage to effect a direct drive from the drive to driven shafts, substantially as described.

19. In a speed-controlling mechanism, the combination of a drive shaft, a driven shaft, a chambered member connected to the driven shaft, an eccentric piston on the drive shaft located in the interior of said chambered member and providing a passage between the outer periphery of the piston and the inner wall of said chambered member, said piston when moved with respect to the inner wall of the chambered member changing the area of said passage at any given point on said inner wall, a propelling medium within the chambered member given a movement within said passage by the rotation of the piston, a series of movable abutments carried by the chambered member and adapted to be extended into and withdrawn from said passage and provide resistance surfaces to the flow of medium through said passage, a cam operated by the movements of the drive shaft, means actuated by the movements of the cam for moving said abutments into and out of the passage, said cam being configured to move said abutments in accordance with the movements of the piston with respect to the inner wall of the chambered member, whereby a uniform aggregate amount of resistance surface is maintained in said passage, means for shifting the position of the abutment moving means with respect to the cam to change the amount of resistance surface presented, a surface on the cam for imparting a movement to the abutment moving means for holding the abutments fully extended across said passage, a surface on the cam for imparting a movement to the abutment moving means for holding the abutments fully withdrawn from said passage, and a surface on the cam for imparting variable movements to the abutment moving means to project the abutments variable distances across the passage, substantially as described.

20. In a speed controlling mechanism, the combination of a driving shaft, a driven shaft, a casing member secured to one of said shafts, a piston member eccentrically secured to the other of said shafts, said casing having a circular chamber in which the piston revolves, said chamber being of greater diameter than the piston to provide a passageway between the piston and wall of the chamber, a propelling medium in the chamber given a movement in the passageway by movement of the member carried by the drive shaft, an abutment movable in the casing member, means for moving said abutment to project it variable distances into the passageway, said abutment when so projected offering a contacting surface for the medium in said passageway and controlling the flow of the medium through said passage to impart movement from the drive shaft to the driven shaft, substantially as described.

LEVI M. SHAW.